United States Patent [19]

Gee et al.

[11] Patent Number: 4,529,277

[45] Date of Patent: Jul. 16, 1985

[54] FOLDABLE REFLECTOR

[75] Inventors: David P. Gee; Bernard J. Edwards, both of Stevenage, England

[73] Assignee: British Aerospace Public Limited Company, London, England

[21] Appl. No.: 488,708

[22] Filed: Apr. 26, 1983

[30] Foreign Application Priority Data

Apr. 28, 1982 [GB] United Kingdom ................. 8212236

[51] Int. Cl.[3] ......................... G01B 5/10; H01Q 15/20

[52] U.S. Cl. .................................... 350/613; 343/915; 350/626

[58] Field of Search ....................... 350/292, 613, 626; 343/915, 840

[56] References Cited

U.S. PATENT DOCUMENTS 3,699,576 10/1972 Hoyer ................................ 343/915
3,715,760 2/1973 Palmer ............................... 343/915
4,130,106 12/1978 Clevett et al. ...................... 350/292
4,257,404 3/1981 Steinberg ........................... 350/292
4,315,265 2/1982 Palmer et al. ....................... 343/840

FOREIGN PATENT DOCUMENTS 42420 3/1980 Japan .................................. 343/840

*Primary Examiner*—Jon W. Henry
*Attorney, Agent, or Firm*—Cushman, Darby & Cushman

[57] ABSTRACT

A solid surface reflector for being stowed in a constrained volume on a spacecraft comprises a central portion 10 with a series of peripheral elements 11 and 11' hingedly attached around the periphery thereof for folding movement about axes 14, 14' tangential to a circle centered on the center X of the reflector. Those elements referenced 11 have axes 14 spaced radially further from the center of the reflector than the axes 14' of elements 11' so that from a stowed condition with all the elements 11, 11' overlying central portion 10, firstly elements 11 may be unfolded and then elements 11' may be unfolded, without fouling, to define a rigid, generally smooth reflector surface wherein the gaps between adjacent elements are not significant.

4 Claims, 4 Drawing Figures

FOLDABLE REFLECTOR

This invention relates to reflectors which are foldable for stowage and in particular to such reflectors for use on a spacecraft.

In space applications the requirement for high operating frequencies has led to the use of solid surface reflectors, rather than mesh-type reflectors. The high gain sought has led to large diameter reflectors. However, the reflector must still be stowable within the stowage envelope of the vehicle which launches the spacecraft. In addition for efficient operation of the reflector, it is required that the central portion of the reflector be as large as possible and that gaps in the deployed surface profile be as small as possible. Similarly, since such reflectors when used in space applications will normally be deployed automatically, it is important that the construction and mode of deployment of the reflector be relatively simple so as to reduce the possibility of failure in deployment.

According to one aspect of this invention, there is provided a foldable reflector arrangement which comprises a central portion, at least two groups of peripheral elements located around the periphery of the central portion, each for hinging about a pivot axis generally tangential to a circle centred on a central axis of the central portion between a folded position in which they at least partially overlie said central portion and a deployed position in which, together with other such peripheral elements and the central portion, they define a substantially smoothly curved reflector surface, the peripheral elements being arranged so that each element is not adjacent a peripheral element of the same group, the elements of each group being arranged with their respective pivot axes lying at substantially the same common distance from said central axis, but being arranged with their pivot axes closer to or further from the central axis than peripheral elements of other groups.

Preferably, the pivot axes of each peripheral element pass through respective edge portions of the central portion. Conveniently, each peripheral element is hingedly carried on the central portion by means of three spaced hinge means.

Conveniently, deployment means are provided for each group of peripheral elements, there being sequencing means to effect deployment of the groups one after another.

Further aspects of this invention will be apparent from the following description of a specific embodiment with reference to the accompanying drawings, in which.

Figure 1:
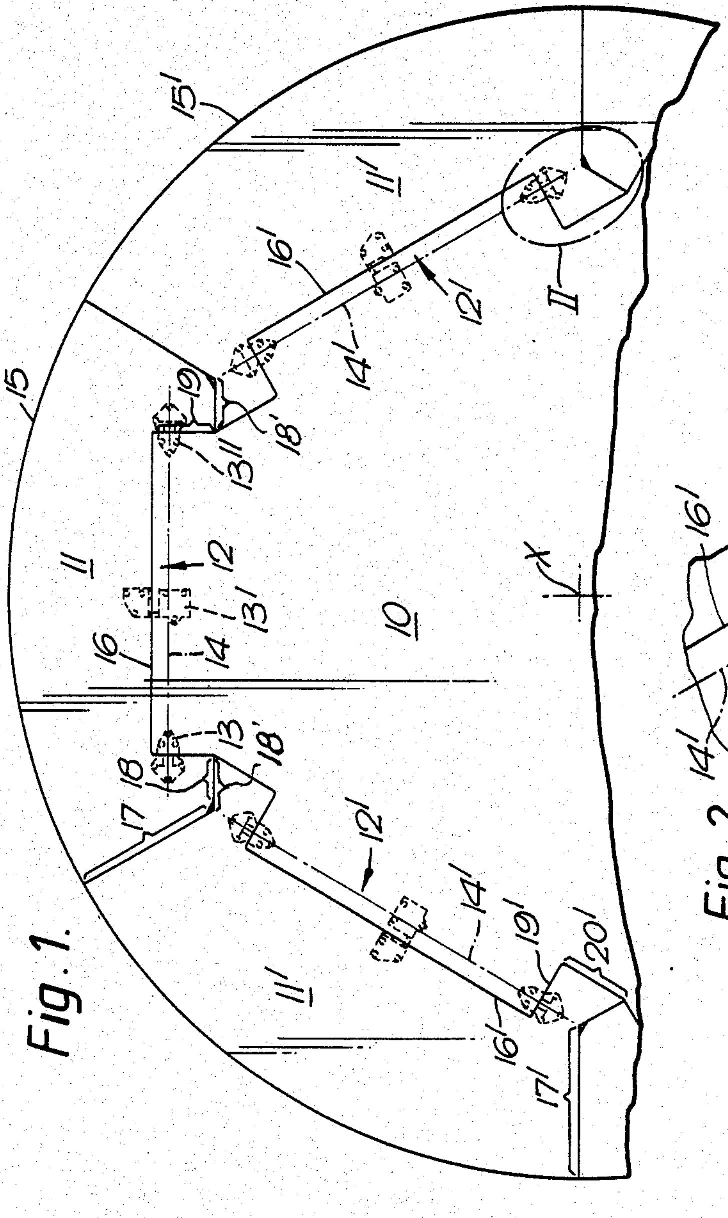
FIG. 1 is a front partial view of a foldable reflector when deployed.

The reflector illustrated is of generally circular concave form when deployed and comprises a central portion 10 with a series of peripheral petal elements 11, 11′ each hingedly attached to spaced edge regions 12, 12′ of the central portion by means of three hinge elements 13, 13′ and 13″. This arrangement of hinge allows precise alignment of the concave surface of each petal element with that of the central portion.

The petal elements are arranged in two groups 11, 11′, with petals from each group arranged alternately around the periphery of the central portion. The petals of each group are arranged for hinging movement about respective pivot axes 14, 14′, arranged tangentially with respect to a circle centred on the centre X of the central portion and the pivot axes 14 of one group of petal elements 11 are arranged radially further from the centre X than the pivot axes 14′ of the other group of petal elements 11′.

Figure 2:
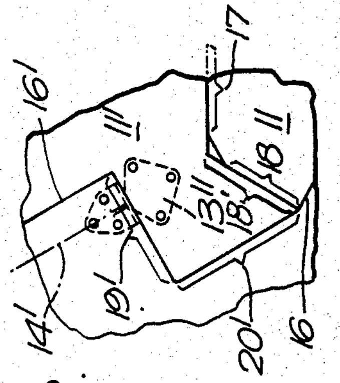
FIG. 2 is a detail view of an area II of FIG. 1.

Referring now to the preferred specific shape of the petal elements 11, 11′, each element 11 is bounded by an outer circular arc 15 centred on centre X and an inner edge portion 16 which extends parallel to the respective pivot axis 14 but spaced radially outwardly to accommodate the outermost portion of the respective edge region of the central portion. Referring now to the side edge regions of the petal element 11, these comprise an outer portion 17 which extends radially to intersect the pivot axis 14′ of the next adjacent petal element, an inner portion 18 which lies parallel to the respective pivot axis 14 but spaced radially inwardly therefrom, and an edge portion 19 which extends perpendicular to pivot axis 14 to bridge inner edge portion 16 and inner portion 18. In practice, portions 17 and 18 may be blended as shown in FIG. 2.

Each element 11′ is bounded by an outer circular arc 15′ centred on X, an inner straight edge portion 16′ parallel to pivot axis 14′, portions 17′ extending radially, portions 18′ parallel to the pivot axis 14 of the next adjacent petal element, portions 20′ which extend parallel to the pivot axis 14′, and portions 19′ which extend perpendicularly to the pivot axis 14′. The central portion 10 is complementarily shaped as shown in the Figure so that when the petal elements 11, 11′ are extended, the reflector has a substantially continuously curved concave profile. In the above discussion, terms such as "radial", "straight", refer to edges of the petal elements as viewed in plan. The shapes of the peripheral elements and the central portion are selected so as to avoid significant gaps occurring between adjacent elements when the reflector is deployed.

For stowage from the position shown in FIG. 1, the group of petal elements 11′, having their pivot axes 14′ nearer centre X are folded towards the centre and spring loaded snubbers (not shown) are used to maintain the clearance from the central portion 10. The other group of petal elements 11 may then be folded towards the centre, above the previously folded elements 11′ because of the greater distance of their pivot axes 14 from the centre. The shape of the petal elements 11, 11′ is such as to minimise the stowed volume of the reflector without causing fouling.

Figure 3:
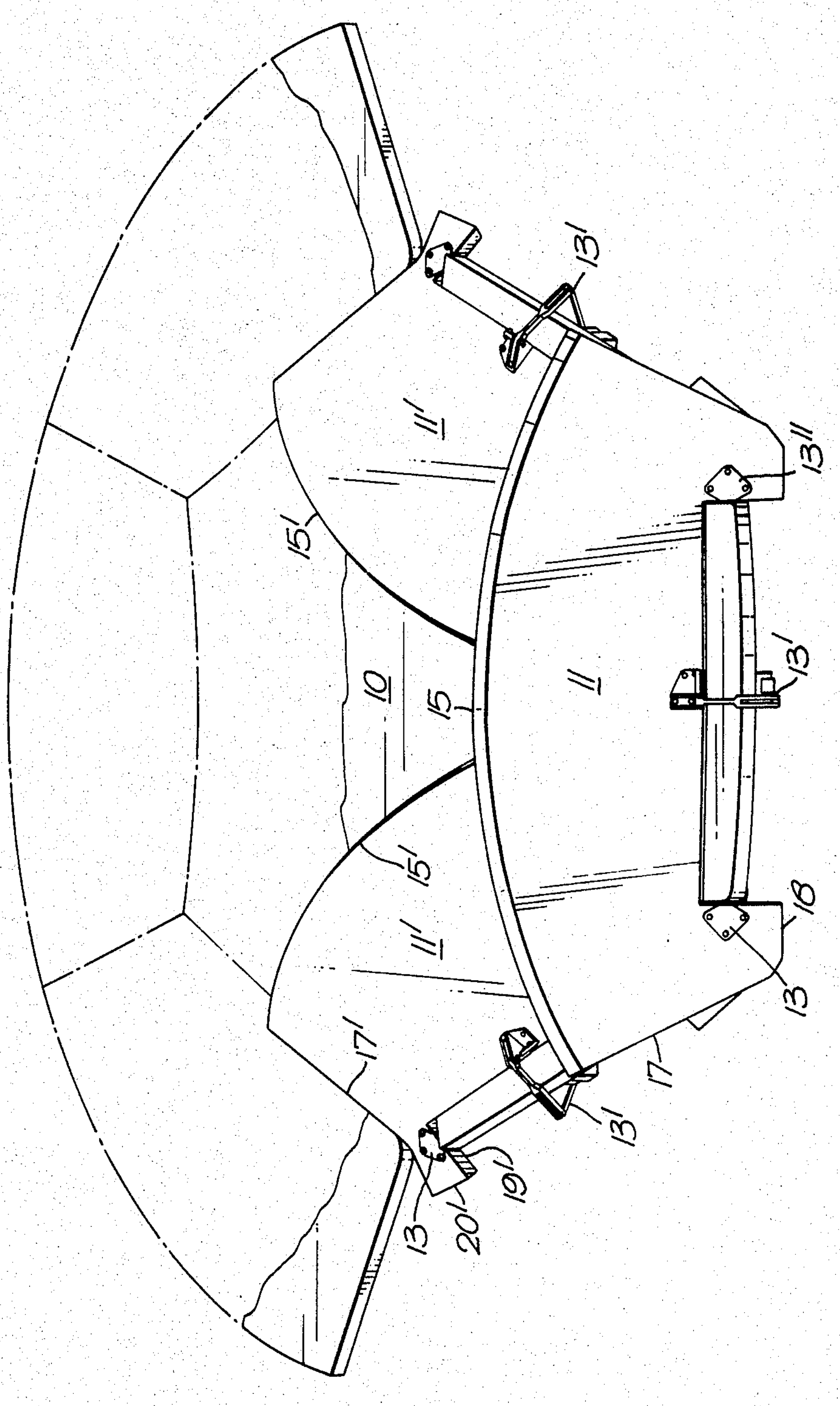
FIG. 3 is a schematic perspective view showing how the elements of the reflector are stowed.
Figure 4:
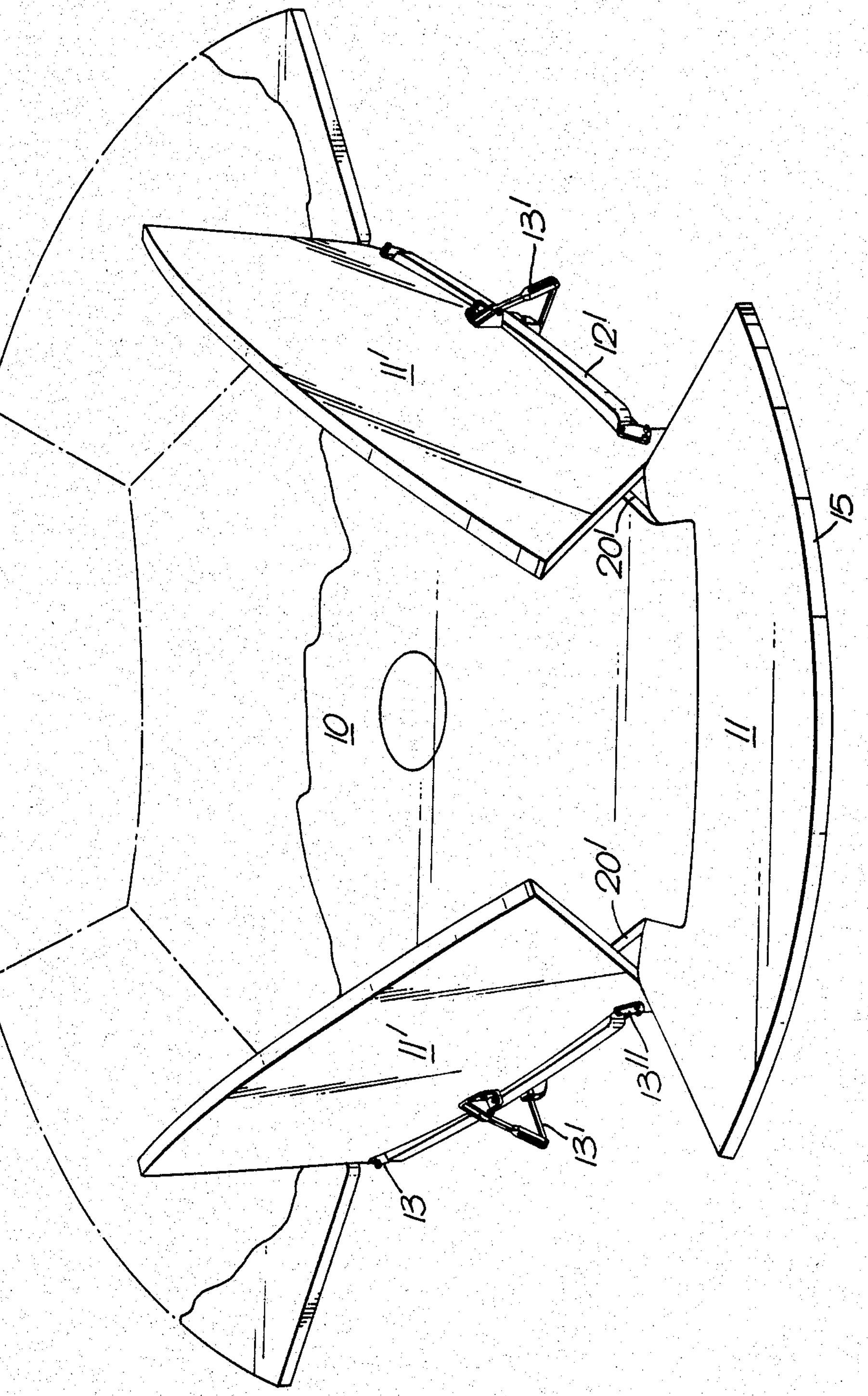
FIG. 4 is a schematic perspective view similar to FIG. 3 but with the elements in an intermediate configuration.

FIGS. 3 and 4 show schematically the reflector when stored and at an intermediate stage prior to deployment respectively. For ease of illustration, in both Figures three petal elements in the upper part of the Figure are shown already deployed; it should be understood that this would not occur in practice.

A pyrotechnic deployment device (not shown) maintains the reflector in the stowed position until it is deployed, and a deployment device for each petal element 11, 11′ in the form of a torsion spring 13′ of known design is operable to effect unfolding of the petals to the position shown in FIG. 1 where each are held by associated latch means (not shown). Furthermore, the pyrotechnic deployment device is arranged to effect deployment of petal elements 11 fractionally in advance of petal elements 11' so as to avoid fouling between the petal elements.

The specific embodiment illustrated is for use in transmitting and/or receiving radiation in the radio frequency band and the central portion 10 and petal elements 11, 11' may be formed of a sandwich material having a honeycomb aluminium core sandwiched between two layers of carbon-fibre reinforced plastics material.

Whilst the described embodiment is of circular plan form with six petal elements arranged in two groups, foldable reflectors of other plan forms, having different numbers of petal elements and different groups may be manufactured in accordance with this invention.

The embodiment described with reference to the drawings comprises a centre piece and six petal elements; the reflector therefore has relatively few surface components and the design therefore enables the reflector to be manufactured to close tolerances and also the gaps between the surface components to be relatively small. These features combine to give a relatively simple yet rigid antenna reflector. Furthermore the stowage volume of the reflector when stowed is relatively flat.

It is intended that the reflector be initially formed in one piece and then cut as necessary to sub-divide it into its various petal elements and central portion.

It will be seen that for deployment of the reflector from a folded state, hinging movement is required only about axes lying substantially within the reflector itself; no complex or compound twisting movements are required and this feature further assists in providing a rigid structure.

We claim:

1. A foldable reflector arrangement which comprises a central portion, at least two groups of peripheral elements located around the periphery of the central portion each for hinging movement about a pivotal axis generally tangential to a circlecentred on a central axis of the central portion between a folded position in which they at least partially overlie said central portion and a deployed position in which together with other such peripheral elements and the central portion they define a substantially smoothly curved reflector surface, the peripheral elements being arranged so that each element is not adjacent a peripheral element of the same group, the elements of each group being arranged with their respective pivotal axes lying at substantially the same common distance from said central axis but being arranged with their pivotal axes closer to or further from the central axis than peripheral elements of other groups.

2. A foldable reflector arrangement as claimed in claim 1 of generally circular plan form and having two groups of peripheral elements.

3. A foldable reflector arrangement as claimed in claim 1 wherein the pivotal axes of each peripheral element pass through respective edge portions of the central portion.

4. A foldable reflector arrangement as claimed in claim 1, wherein deployment means are provided to effect deployment of each group of peripheral elements, the arrangement being adapted to effect deployment of the groups one after another.

* * * * *